United States Patent [19]

Jansen

[11] Patent Number: 4,890,324
[45] Date of Patent: Dec. 26, 1989

[54] ENCIPHERING/DECIPHERING METHOD AND ARRANGEMENT FOR PERFORMING THE METHOD

[75] Inventor: Cornelis J. A. Jansen, Eindhoven, Netherlands

[73] Assignee: U.S. Philips Corp., New York, N.Y.

[21] Appl. No.: 118,384

[22] Filed: Nov. 6, 1987

[30] Foreign Application Priority Data

Nov. 11, 1986 [NL] Netherlands ............ 8602847

[51] Int. Cl.$^4$ ............................. H04L 9/02
[52] U.S. Cl. ............................. 380/43; 380/21; 380/29; 380/46
[58] Field of Search ............... 380/21, 43–47, 380/49, 50, 29, 42

[56] References Cited

U.S. PATENT DOCUMENTS

| | | | |
|---|---|---|---|
| Re. 30,957 | 6/1982 | Feistel | 380/50 X |
| 3,781,472 | 12/1973 | Goode et al. | 380/44 X |
| 4,115,657 | 9/1978 | Morgan | 380/46 |
| 4,195,196 | 3/1980 | Feistel | 380/50 X |
| 4,211,891 | 7/1980 | Glitz | 380/48 |
| 4,343,967 | 8/1982 | McArdle | 380/50 |
| 4,349,695 | 9/1982 | Morgan et al. | 380/49 X |
| 4,429,180 | 1/1984 | Unkenholz | 380/44 X |

FOREIGN PATENT DOCUMENTS 0011615 6/1983 European Pat. Off. .

*Primary Examiner*—Stephen C. Buczinski
*Assistant Examiner*—Bernarr Earl Gregory
*Attorney, Agent, or Firm*—Emmanuel J. Lobato

[57] ABSTRACT

A key stream is generated, and successive keys and instruction words are derived from it. A character is enciphered with a derived key by an enciphering operation determined by the instruction word. A subsequent character is enciphered with the next key derived from the key stream by another enciphering operation determined by the next derived instruction word. Any transmission errors which may occur in the enciphered characters do not propagate, resulting in effective enciphering and reliable deciphering.

18 Claims, 1 Drawing Sheet

ENCIPHERING/DECIPHERING METHOD AND ARRANGEMENT FOR PERFORMING THE METHOD

BACKGROUND OF THE INVENTION

The invention relatees to a method of enciphering information-containing digital data signals with the aid of enciphering keys and of deciphering a message thus enciphered, utilizing the same key.

Such a method is disclosed in, for example, European Patent Specification 0011615. The key usually consists of a long sequence of binary numbers (ones and zeroes). Cryptographic text is obtained by adding the key (mostly exclusive-OR per bit) to the clear text to be enciphered. This cryptographic text is transferred or transmitted to a receiver where the original, clear text is obtained by subtracting the same key as utilized in the transmitter from the received cryptographic text. For uses where very high demands are imposed on the quality of the enciphering this method has many shortcomings.

SUMMARY OF THE INVENTION

It is an object of the invention to provide a method by means of which clear text can be enciphered very reliably and error propagation due to any type of transmission errors is prevented. According to the invention, the enciphering method of the type defined in the opening paragraph is characterized in that the data signals to be enciphered are processed with the aid of an enciphering key which is derived from a key text and in that the nature of the processing or enciphering operation performed on the data signals to be enciphered is determined by an instruction command which is also derived from the key text.

This method has the advantage that the number of processing operations which can be performed on the clear text/key combination is (very) large. In contradistinction thereto, only two processing operations are possible in the conventional system, namely adding (modulo-2) and adding followed by inverting. A further advantage of the method according to the invention is that no error propagation occurs. One incorrectly received cryptographic text character does not produce more than one faulty character in the clear text.

The invention is based on the recognition that a "spoofer" must know the processing or enciphering function used to be successful in "spoofing". As a—in the statistical sense—unique function is selected for each character to be enciphered, the chances the "spoofer" is successful is inversely proportional to the number of possible functions to the power of the number of characters to be spoofed and consequently can be reduced to any arbitrary small extent.

It is advantageous for the processing or enciphering operations performed to include the cyclic changes or rotation of from 0 to (n-1) of the bits of the character to be enciphered, the character to be enciphered comprising n bits.

It is advantageous for the processing operations performed to include the modulo-$2^m$ addition of the key character or groups of bits thereof to the character to be enciphered or groups of bits thereof, it being possible for m to assume any value between 1 and n.

The invention further relates to an arrangement or apparatus for performing the method. According to the invention, this arrangement is characterized in that it includes a control means or controller, an input of which is connected to the key text or key stream generator and a first output of which is connected to the enciphering unit for providing a key character and a second output of which is also connected to the enciphering unit for providing the instruction command. The enciphering unit includes means for enciphering a character of the digital data signals under the control represented by the instruction command and the key character.

BRIEF DESCRIPTION OF THE DRAWING

Further particulars and advantages will become apparent from the description of an embodiment given with reference to the accompanying drawing, wherein.

DETAILED DESCRIPTION OF THE INVENTION

Figure 1:
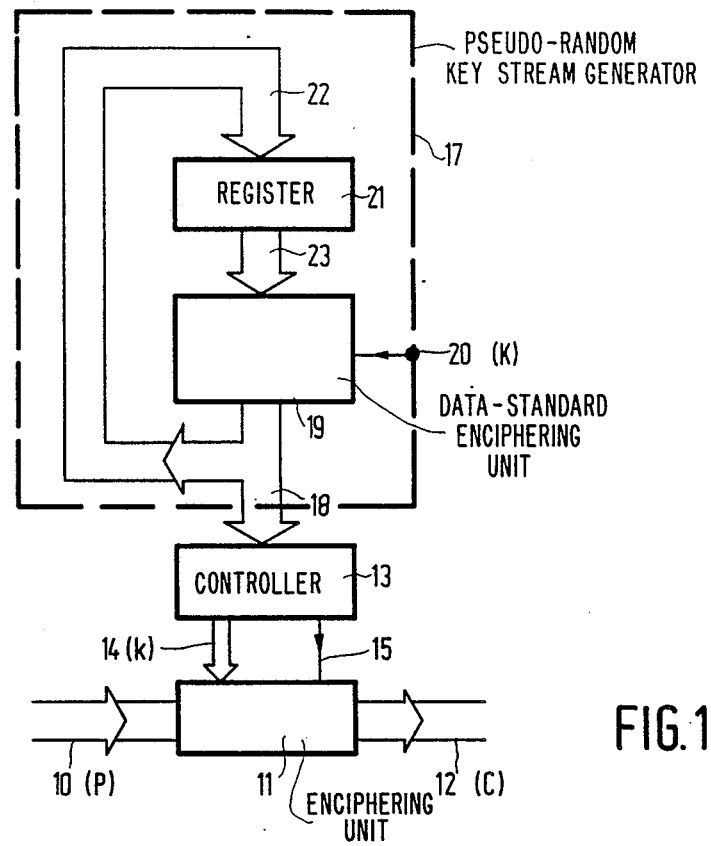
FIG. 1 is a circuit diagram of an enciphering apparatus according to the invention.

FIG. 1 shows an arrangement for character-based enciphering utilizing what is commonly referred to as the "streamcipher" principle. Characters are digital data comprising plurality of digits; in the case of binary data a plurality of bits. These characters together constitute an alphabet such as, for example, the ASCII or the BAUDOT alphabet.

The clear text in thee form of a sequence of characters represented as digital data to be enciphered is applied to an enciphering unit 11 via a bus 10 having, for example, the same number of signal wires as there are bits in a character. By processing the clear text, the crypto text appears at the output 12 of enciphering unit 11. The output 12 is, for example, also constituted by a bus having the same number of signal wires as there are bits in a crypto character. Processing of the clear text is effected by a controller 13 connected to the enciphering unit 11. The controller has a first output 14 via which a what is commonly referred to as a key K is applied to the enciphering unit 11. The key K has a sequency of binary numbers ("ones" and "zeroes") in a psuedo-random sequence which is generated in a manner still further to be described. The key does not contain a stationary pattern of binary numbers but always utilizes a variable pattern.

In addition, the controller 13 has a second output 15 via which an instruction command can be transferred to the enciphering arrangement. The instruction command specifies the nature of the processing function to be performed by the enciphering, unit 11 on the clear text and on the key. Let the clear text be P ("plain text") and the key be K ("key") and the enciphered text be C ("crypto text"). Then, the instruction command specifies the function F by means of which the crypto text C is obtained by subjecting the clear text P to the processing operation F utilizing key K. Expressed in a formula:

$$C = F_k(p) \tag{1}$$

The inverse operation is effecte in the receiver and the received crypto-text is deciphered in accordance with:

$$P = F_k^{-1}(C) \tag{2}$$

From this it appears that the operating function F should preferably be of a type which is "easily" invertible when K is known.

The key and the instruction command are derived from a pseudo-random key text or key stream generator 17. This generator includes a Data Encryption Standard (DES) enciphering unit 19 in the OFB-mode (Output feedback mode) which, as is shown in the Figures, is a self-contained streamcipher. DES or data-standard-enciphering units are known per se. See, for example, the article by W. Diffie and M. E. Hellman, entitled "Privacy and authentication: and introduction to cryptography", published in Proc. IEEE Vol. 67, No. 3, March 1979, pages 397–427, more specifically FIG. 13 and the associated text.

A key K is applied to a first input 20 of the data-standard-enciphering unit 19. On the basis thereof the data-standard-enciphering unit 19 generates a pseudo-random key text or key stream of, for example, 64 bits at an output 18. This text is applied to both the controller 13 and—via bus 22—to an input of register 21. When a subsequent pseudo-random key text is generated, this is based on (a portion of) the previous text and the key K. For that purpose an output of the register 21 is connected to a second input 23 of the data-standard-enciphering unit 19.

Although for the pseudo-random key text generator 17 shown in FIG. 1 use is made of a DES OFB streamcipher such an embodiment is absolutely not essential to the invention: any other embodiment of the key text generator 17 is equally suitable provided a signal of the desired type is available at output 18.

The controller 13 operates as follows: A key character is derived from the key text applied via bus 18. If the clear text to be enciphered consists of eight-bit words, a key character of likewise 8 bits is, for example, selected. These bits may, for example, be the first eight (or the last of the center etc.) bits of the key text applied via bus 18. An instruction command is also derived from the applied key text. The instruction command is merely a number (for example a 7-bit binary number) which can assume arbitrary values in a predetermined, accurately defined field. It is, for example, possible for the number to assume all the integral values between 0 and 127. The value of the number determines, as is described in the foregoing, which processing or enciphering the enciphering unit 11 will perform.

A plurality of functins may serve as the operating function $F_k$. One possibility might be the cyclic interchange of the bits of a character of the clear text through n positions, n being determined by a number of bits of the instruction command (so a maximum of 7 positions if the character consists of eight bits). The characters 11011001 "rotated" through 4 positions then becomes 10011101. A second possibility might be the modulo-$2^m$ addition of a clear text character and a key text character depending on the value of a number of bits of the instruction command. Thus, the eight bits of the character of the clear text might be added modulo-4 in four groups of 2 bits to the likewise four groups of 2 bits each of the key text character. Continuing along this line, the following eight possibilities would consist for eight-bit characters, namely:

(a) 8 bits modulo-2
(b) 4 times 2 bits modulo-4
(c) 2 times 3 bits modulo-8 and 1 times 2 bits modulo-4
(d) 2 times 4 bits modulo-16
(e) 1 time 5 bits modulo-32 and 1 times 3 bits modulo-8
(f) 1 time 6 bits modulo-64 and 1 times 2 bits modulo-4
(g) 1 time 7 bits modulo-128 and 1 times 1 bit modulo-2
(h) 1 times 8 bits modulo-256

Together with furthe combinations a total of more than 100 variations are possible for a 8-bit character. The number of possibilities increases exponentially with the length of the character.

Figure 2:
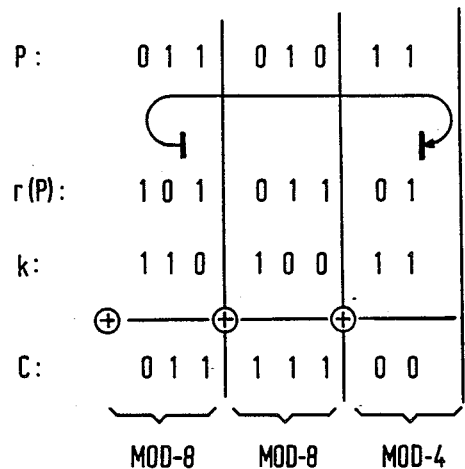
FIG. 2 shows an example of the bit patterns such as they occur in the enciphering apparatus of FIG. 1.

Classes of processing functions other than the functions described here are alternatively possible. The processing functions may alternatively be combined, as will be demonstrated on the basis of the following example (FIG. 2). The character P (8 bits) to be enciphered is 01101011. This character is first subjected to a cyclic interchange through 2 bits procedure. This results in the character r(P), namely 10101101. This rotation can be indicated by three bits (3 bits are required to indicate a rotation through 0–7 bits) of the instruction command.

The clear text character thus rotated is thereafter processed as follows. The clear text character r(P) is divided into three groups, namely two groups of three bits each and one 2-bit group. The key text character k (11010011) is divided in a similar manner into three groups. Thereafter the corresponding groups are added together modulo-8 or modulo-4, as the case may be, (in conformity with the above-indicated possibility (c)). Also this adding operation can be defined by three bits of the instruction command (c is one of the above-mentioned 8 possibilities a to h, inclusive). The resulting crypto text character C then is 01111100. This character is transmitted to a receiver and deciphered there.

This manner of enciphering has the advantage that an error caused, for example, by an interference in the receiver, cannot result in more than one faulty clear text character being received. So no error propagation occurs as does occur in many other enciphering methods.

The enciphering unit 11 and the controller 13 can be realised in the form of what are commonly referred to as wired logic modules. A more attractive possibility is, however the realisation of the enciphering unit by means of the arithmetical and logic unit (ALU) of a micro-processor and to implement the control arrangement as a program for that micro-processor.

What is claimed is:

1. A method of enciphering information-containing digital data signals with the aid of enciphering keys and of deciphering a message thus enciphered, utilizing the same key, characterized in that the data signals to be enciphered are enciphered with the aid of an enciphering key derived from a key text and in that the enciphering operation performed on the data signals to be enciphered is determined by an instruction command wich is also derived from the key text.

2. An enciphering and deciphering method as claimed in claim 1, characterized in that the enciphering operation performed includes the cyclic interchange from 0 to (n-1) bits of the bits of the characters to be enciphered, the character to be enciphered comprising n bits.

3. An apparatus for performing the method as claimed in claim 2, the apparatus including an enciphering unit and a key text generator coupled thereto, the enciphering unit having an input for receiving clear digital data signals, characterized in that the apparatus includes a controller having an input which is connected to the key text generator, and a first output which is connected to the enciphering unit for providing a key character and a second output which is also connected to the enciphering unit for providing the instruction command, and the enciphering unit includes means for enciphering a character of the digital data signals under the control of the instruction command and the key character.

4. An enciphering and deciphering method as claimed in claim 1, characterized in that the enciphering operation performed includes the modulo-$2^m$ addition of groups of bits of the key character to groups of bits of the characters to be enciphered, wherein $1 \leq m \leq n$.

5. An apparatus for performing the method as claimed in claim 4, the apparatus including an enciphering unit and a key text generator coupled thereto, the enciphering unit having an input for receiving clear digital data signals, characterized in that the apparatus includes a controller having an input which is connected to the key text generator, and a first output which is connected to the enciphering unit for providing a key character and a second output which is also connected to the enciphering unit for providing the instruction command, and the enciphering unit includes means for enciphering a character of the digital data signals under the control of the instruction command and the key character.

6. An enciphering and deciperhing method as claimed in claim 4, wherein the enciphering operation performed includes the modulo-$2^m$ addition of the entire key characteer to the characters to be enciphered.

7. An apparatus for performing the method as claimed in claim 1, the apparatus including an enciphering unit and a key text generator coupled thereto, the enciphering unit having an input for receiving clear digital data signals, characterized in that the apparatus includes a controller having (13) an input which is connected to the key text generator, and a first output which is connected to the enciphering unit for providing a key character and a second output which is also connected to the enciphering unit for providing the instruction command, and the enciphering unit includes means for enciphering a character of the digital data signals under the control of the instruction command and the key character.

8. A method of enciphering a sequence of characters represented in digital form by digital data, comprising:
   developing a pseudo-random key stream;
   deriving n enciphering key from said key stream;
   deriving an instruction command from said key stream;
   enciphering a character in digital form with said derived key by an enciphering operation determined by said instruction command; and
   repeating the sequence of steps on a subsequent character is digital form to be enciphered with another key from said key stream.

9. A method of enciphering according to claim 8, wherein the sequence of characters in digital form to be enciphered are represented by digital data comprised of n digits; and
   wherein said enciphering opertion performed on a character in digital form comprises the cyclic interchange of from 0 to (n-1) digits of the digital data representing the characters to be enciphered.

10. A method of enciphering according to claim 9, wherein the sequence of characters to be enciphered are represented by binary digital data comprised of n bits.

11. A method of enciphering according to claim 8, wherein the sequence of characters in digital form to be enciphered are represented by digital data comprised of n digits;
   wherein said enciphering operation performed on a character in digital form comprises modulo-$r^m$ addition of groups of digits of the key to groups of digits of the digital data representing the characters to be enciphered, wherein $1 \leq m \leq n$, and r is the base of the digital data.

12. A method of enciphering according to claim 11, wherein the sequence of characters in digital form to be enciphered are represented by binary digital data comprised of n bits;
   wherein said enciphering operation performed on a data character in digital form comprises modulo-$2^m$ addition of groups of bits of the key of bits of the binary digital data representing the characters to be enciphered, wherein $1 \leq m \leq n$.

13. An enciphering apparatus comprising:
   key stream generating means for generating a pseudo-random key stream;
   enciphering means receptive of a key and an instruction command for enciphering an input character with the key by an enciphering operation determined by said instruction command; and
   control means receptive of the key stream for deriving successive keys and successive instruction commands from the key stream and for applying successive key-instruction command pairs to said enciphering means thereby controlling enciphering of a character sequence with successive characters enciphered with different keys and by different enciphering operations.

14. An enciphering apparatus according to claim 13, wherein said enciphering means is effective for enciphering characters represented by binary digital signals comprised of n bits.

15. An enciphering apparatus according to claim 14, wherein said enciphering means is effective for enciphering a character by the cyclic interchange of bits of the binary digital signals representing the characters to be enciphered.

16. An enciphering apparatus according to claim 15, wherein said key stream generating means comprises means for enciphering an initial key to generate the key stream.

17. An enciphering apparatus according to claim 14, wherein said encipering means is effective for enciphering a character by modulo-$2^m$ addition of groups of bits of the key to groups of bits of the binary digital signals representing the characters to be enciphered, wherein $1 \leq m \leq n$.

18. An encryption apparatus according to claim 17, wherein said key stream generating means comprises means for enciphering an initial key to generate the key stream.

* * * * *